(12) United States Patent
Chiu et al.

(10) Patent No.: US 11,520,162 B2
(45) Date of Patent: Dec. 6, 2022

(54) LENS DRIVING DEVICE FOR CAMERA, CAMERA AND ELECTRONIC APPARATUS

(71) Applicant: Changzhou Raytech Optronics Co., Ltd., Changzhou (CN)

(72) Inventors: Ching-Chung Chiu, Shenzhen (CN); Kazuo Shikama, Osaka (JP)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 8 days.

(21) Appl. No.: 17/216,721

(22) Filed: Mar. 30, 2021

(65) Prior Publication Data

US 2022/0206310 A1     Jun. 30, 2022

(30) Foreign Application Priority Data

Dec. 25, 2020   (JP) .............................. JP2020217861

(51) Int. Cl.
*G02B 27/64*      (2006.01)
*G03B 5/00*       (2021.01)

(52) U.S. Cl.
CPC ............. *G02B 27/646* (2013.01); *G03B 5/00* (2013.01); *G03B 2205/0007* (2013.01); *G03B 2205/0069* (2013.01)

(58) Field of Classification Search
None
See application file for complete search history.

(56) References Cited

U.S. PATENT DOCUMENTS

| 2020/0249421 | A1  | 8/2020 | Hu et al. |
| 2022/0150411 | A1* | 5/2022 | Ni ............................. G03B 5/00 |
| 2022/0206309 | A1* | 6/2022 | Chiu ....................... G03B 30/00 |

FOREIGN PATENT DOCUMENTS

| CN | 103186010 A1 | 7/2013 |
| CN | 110460777 A1 | 11/2019 |
| CN | 210864286 U  | 6/2020 |
| CN | 212135039 U  | 12/2020 |

(Continued)

OTHER PUBLICATIONS

1st Office Action dated Jan. 21, 2022 by JPO in related Japanese Patent Application No. 2020-217861(4 Pages).

(Continued)

*Primary Examiner* — Derek S. Chapel
(74) *Attorney, Agent, or Firm* — W&G Law Group

(57) ABSTRACT

The present invention provides a lens driving device, a camera, and an electronic apparatus with a small size, a large correction angle and an excellent hand vibration correction effect. The lens driving device includes a case having an accommodation space, which accommodates a lens module; support frames, support members, and an electromagnetic driving device, for freely rotating the lens module in a direction orthogonal to an optical axis direction; and a base for fixing a circuit board; the electromagnetic driving device is arranged at the support frames and at the base for fixing the circuit board, and is arranged adjacent to a level of a center of gravity of the lens module; and the support frames includes a first support frame and a second support frame, each of the first support frame and the second support frame has different movement axes in a plane and is rotatable freely relative to the base for fixing the circuit board.

9 Claims, 4 Drawing Sheets

(56) References Cited

FOREIGN PATENT DOCUMENTS

| CN | 112731725 A1 | 4/2021 |
|---|---|---|
| CN | 112748507 A1 | 5/2021 |
| JP | 2007041455 A1 | 2/2007 |
| JP | 2020160373 A | 10/2020 |
| JP | 2020204645 A | 12/2020 |

OTHER PUBLICATIONS

1st Office Action dated Oct. 8, 2021 by SIPO in related Chinese Patent Application No. 202011626515.4(9 Pages).
PCT search report dated Sep. 26, 2021 by SIPO in related PCT Patent Application No. PCT/CN2020/142298 (5 Pages).

* cited by examiner

LENS DRIVING DEVICE FOR CAMERA, CAMERA AND ELECTRONIC APPARATUS

TECHNICAL FIELD

The present invention relates to the field of lens driving devices for cameras, and in particular, to a lens driving device, a camera and an electronic apparatus that obtain clear images by avoiding image vibration.

BACKGROUND

With the rapid development of image shooting technology, the requirements for image quality have become higher than ever. Especially when shooting night scenes, in order to improve the shooting quality in a dark environment, there is a need to provide a bright lens or an image vibration prevention function, therefore, the lens driving devices using image vibration correction are widely used in various camera devices and portable electronic apparatuses.

A driving mechanism of the lens driving device suitable for a conventional portable electronic apparatus is generally formed by coils and magnets, and the coils are fixed on an outer periphery of a lens holder. When a current is applied to the coils, the coils drive the lens holder to move along an optical axis direction of the lens under an action of an electromagnetic force, thereby enabling focusing. However, when the user is holding the electronic apparatus while image shooting, the lens driving device will inevitably vibrate due to hand vibration. Therefore, there is a case that the lens keeps moving in a direction orthogonal to the optical axis of the lens. In this case, in the lens driving device, disorder of the captured image is not suppressed, and thus the quality of the captured image is reduced.

In addition, in a conventional linear hand vibration correction device, movement and adjustment direction of the lens is parallel to the optical axis and is parallel to the optical sensor. Therefore, there are concerns about an insufficient optical correction amount when converting a vibration angle or a vibration movement amount of the camera, and in order to increase a vibration correction amount in the direction orthogonal to the optical axis, there is a possibility that the maximum size of the lens driving device may be further enlarged compared with the rotary hand vibration correction device.

The current rotation axis type hand vibration correction device is equipped with double metal suspensions and ball bearings at an upper portion of the lens driving device. It is a structure that can freely rotate in a diagonal line of two axes from four corners, but it is necessary to drive the lens module from a holding part located at a high position away from a driving circuit as a starting point. In a case where a holding method with high rigidity is required or an approximate principal point of the lens cannot be used as the starting point, the optical sensor may not be effectively corrected.

Therefore, there is a need to provide a new lens driving device that can solve the above problems.

SUMMARY

The present invention provides a new lens driving device, aiming to provide a solution of suppressing disorders of the captured image and reducing driving noises in a case where the lens driving device vibrates and the lens keeps moving in a direction orthogonal to an optical axis of the lens due to hand vibration when the user performs image shooting using a camera for an electronic apparatus or an portable terminal.

A purpose of the present invention is achieved in the following way. It should be noted that in the following description, for better illustrating the present invention, the symbols in the drawings are marked in parentheses, but the constituting elements of the present invention are not limited to the constituting elements with these marks, and shall be broadly interpreted to a scope that would be technically understood by those skilled in the art.

An embodiment of the present invention provides a lens driving device, including a case having an accommodation space; a lens module; support frames, support members, and an electromagnetic driving device, for freely rotating the lens module in a direction orthogonal to an optical axis direction; and a base for fixing a circuit board. The lens module, the support frames, the support members, the electromagnetic driving device, and the base for fixing the circuit board are accommodated in the accommodation space; the electromagnetic driving device is arranged at the support frames and the base for fixing the circuit board, and is arranged adjacent to a level of a center of gravity of the lens module; and the support frames includes a first support frame and a second support frame, each of the first support frame and the second support frame has different movement axes in a plane and is rotatable freely relative to the base for fixing the circuit board.

As an improvement, the support members are shaft pins, and at least four shaft pins are provided.

As an improvement, the second support frame has grooves respectively for rotation in a plane respectively along different movement axes.

As an improvement, the electromagnetic driving device includes magnets fixed to the lens module and driving coils fixed to the base for fixing the circuit board.

As an improvement, the second support frame has grooves configured to limit directions of the support members.

As an improvement, the lens driving device further includes magnetic yokes installed to the first support frame.

As an improvement, each of the driving coils is arranged at an outer side of a respective one of the magnets, and the driving coils are configured to rotate under an electromagnetic interaction generated with the magnets.

As an improvement, the lens driving device further includes a leaf spring that connects the lens module and the first support frame, and the leaf spring has magnetism.

In addition, the present invention further provides a camera, including the lens driving device described above In addition, the present invention further provides a portable electronic apparatus, including the camera described above.

As an advantage of the present invention, the lens driving device of the present invention can adjust movement of the optical axis of the lens and limit rotation thereof, thereby achieving a purpose of preventing vibration and improving the quality of the captured image.

Figure 1:
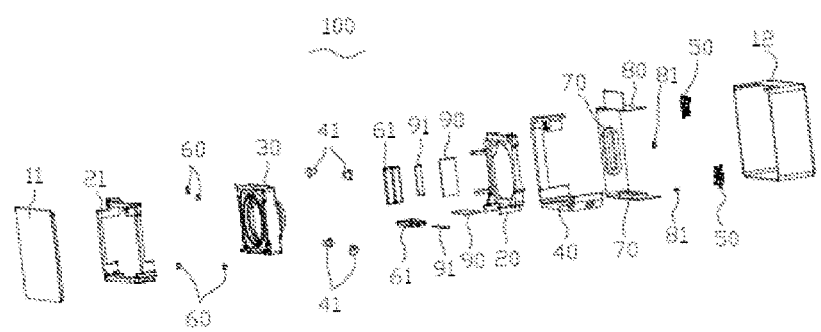
FIG. 1 is an exploded perspective view of a lens driving device according to an embodiment of the present invention.
Figure 2:
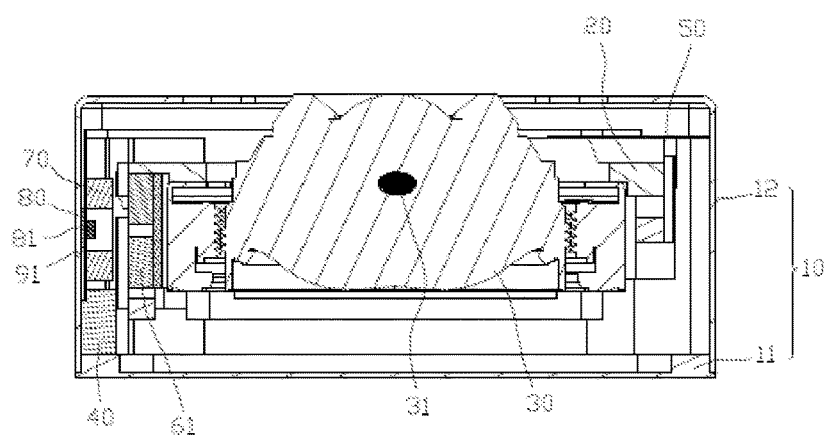
FIG. 2 is a first cross-sectional view of a lens driving device according to an embodiment of the present invention.
Figure 3:
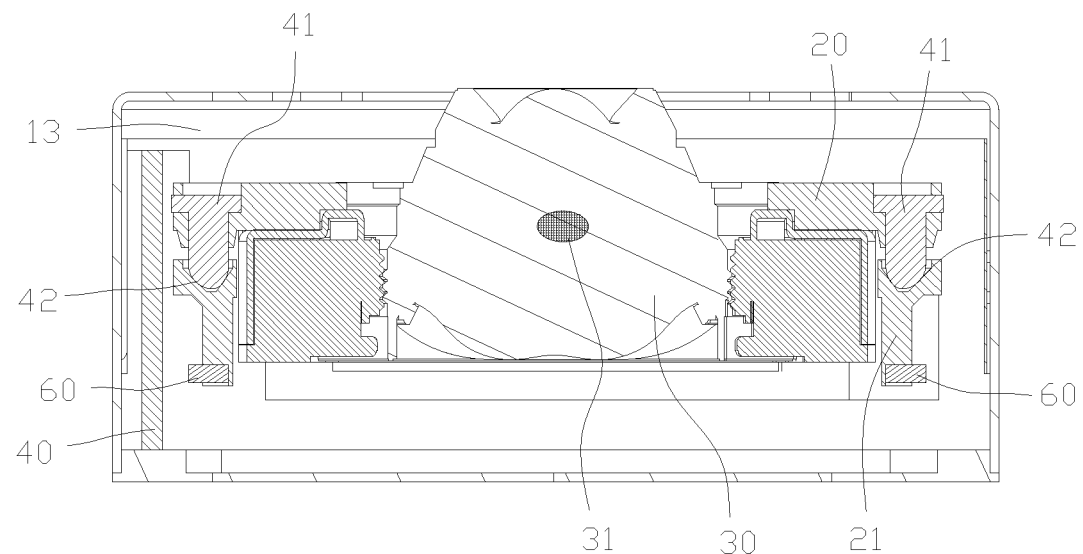
FIG. 3 is a second cross-sectional view of a lens driving device according to an embodiment of the present invention.
Figure 4:
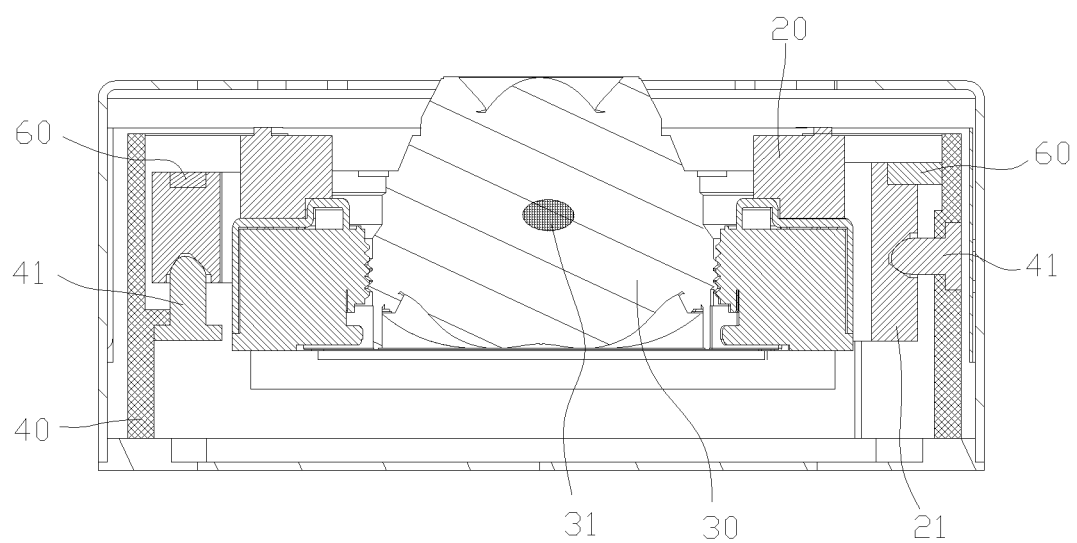
FIG. 4 is a third cross-sectional view of a lens driving device according to an embodiment of the present invention.
Figure 5:
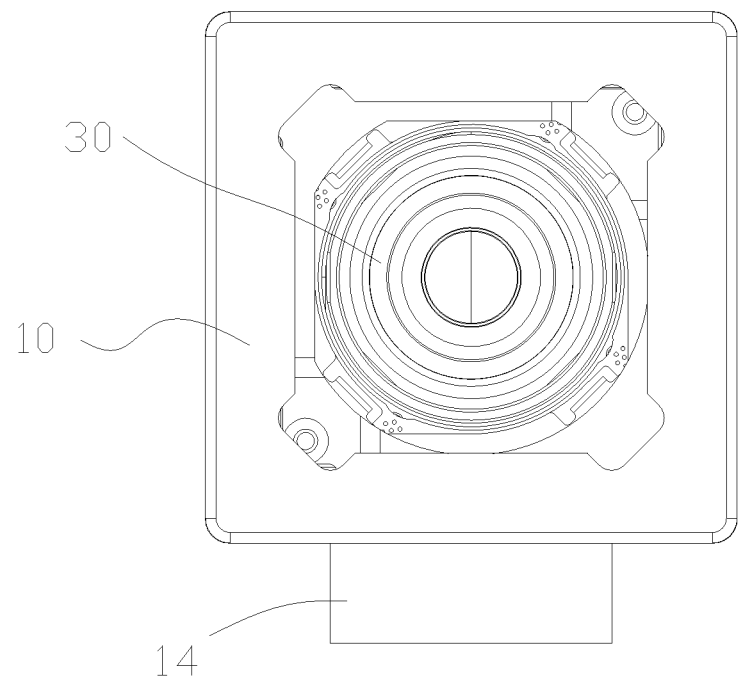
FIG. 5 is a front view of a lens driving device according to an embodiment of the present invention.
Figure 6:
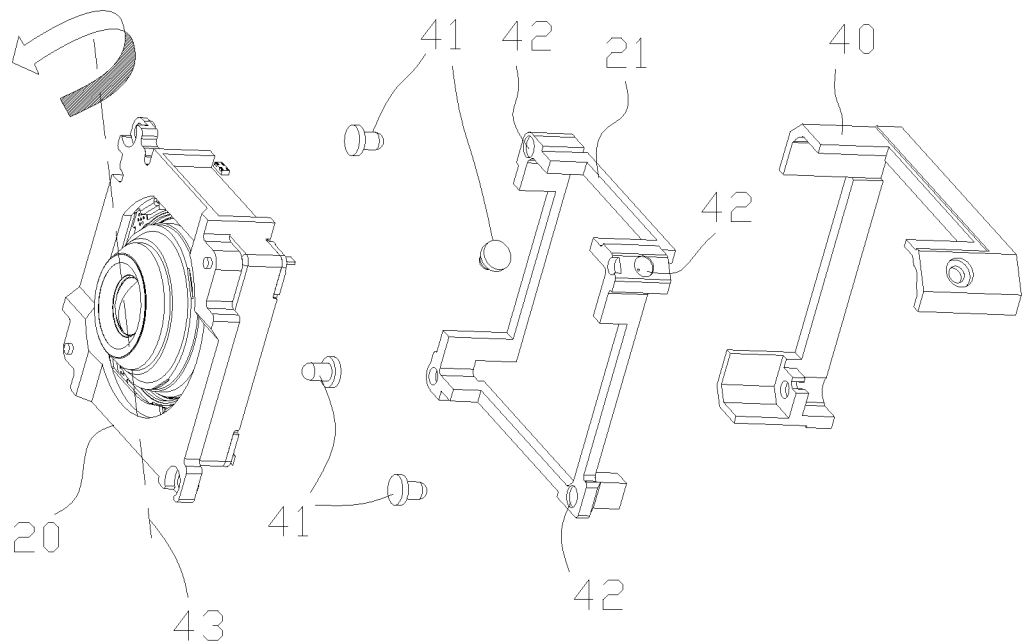
FIG. 6 is a first exploded perspective view of a base for fixing a circuit board and support members according to an embodiment of the present invention.
Figure 7:
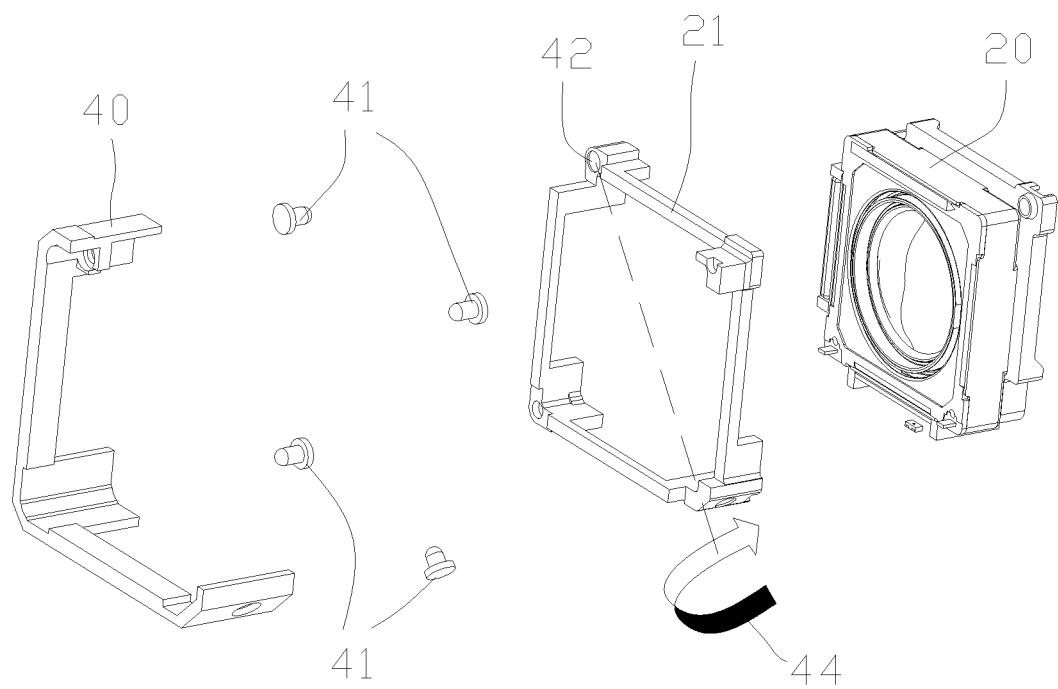
FIG. 7 is a second exploded perspective view of a base for fixing a circuit board and support members according to an embodiment of the present invention.

REFERENCE SIGNS 10 case
11 fixing base
12 cover
13 accommodation space
14 connection terminal provided at a base for fixing a circuit board and connected to the outside
20 first support frame
21 second support frame
30 lens module
31 center of gravity of the lens module
40 base for fixing a circuit board
41 support member
42 groove that limits a direction of the support member
43 first rotation optical axis direction that is limited
44 second rotation optical axis direction that is limited
50 leaf spring that has magnetism
60 magnetic body configured to perform attraction limitation on the support member
61 magnet
70 driving coil
80 circuit board
81 magnetism detecting element including a driving circuit
90 magnetic body configured to maintain magnetic field lines of the magnet
91 magnetic yoke
100 lens driving device
200 portable information apparatus
300 camera device

DESCRIPTION OF EMBODIMENTS

Hereinafter, the present invention will be described in detail with reference to the drawings.

FIG. 1 to FIG. 5 illustrate a lens driving device 100 according to the present invention.

The lens driving device 100 includes a case 10, a lens module 30, a base 40 for fixing a circuit board, support members 41, magnetic bodies 60, and driving coils 70.

The case 10 has an accommodation space 13, and the case 10 includes a fixing base 11, a cover 12 that is in cooperation with the fixing base 11 to form the accommodation space 13, and a circuit board 80.

The base 40 for fixing the circuit board is provided with a circuit board 80 fixed to the base for fixing the circuit board and the driving coils 70.

The support members 41 support the lens module 30 and the second support frame 21 in such a manner that the lens module 30 can freely rotate relative to the base 40 for fixing the circuit board in a direction orthogonal to an optical axis of the lens. The second support frame 21 may be provided with grooves 42 that fix the support members 41 and limit directions of the support members 41.

The support members 41 may be shaft pins. At least four shaft pins (i.e., four support members 41) are provided, and they are correspondingly provided on the base 40 for fixing the circuit board and the lens module 30. With the two support members 41 that pass the vicinity of a principal point of the lens module (i.e., at positions that are approximately symmetrical with respect to the vicinity of the principal point) and are arranged at the base 40 for fixing the circuit board, and the grooves 42 that limit the directions of the support members, rotation axes are limited. Through rolling of the shaft pins (i.e., the support members 41), the lens module 30 can freely rotate in a first rotation optical axis direction 43 that is limited, and in a second rotation optical axis direction 44 that is limited, based on a direction orthogonal to the optical axis of the lens.

In addition, the base 40 for fixing the circuit board, the four support members 41, the second support frame 21, the lens module 30, and the first support frame 20 arranged on the lens module 30 are sequentially assembled along the optical axis direction. Through a magnetic action of the magnetic bodies 60 that perform attraction limitation on the support members 41 provided at the lens module 30 and the support members provided at the base 40 for fixing the circuit board and the second support frame 21, these members are attracted towards the optical axis direction so that they will not fall off in any direction.

Magnets 61 are installed and fixed to the first support frame 20 provided on the lens module 30.

Leaf springs 50 connect the lens module 30 and the base 40 for fixing the circuit board.

The leaf springs 50 are made of a magnetic material, and through a magnetic action of the magnetic bodies 60 that performs attraction limitation on the support members 41 and the support members provided at the base 40 for fixing the circuit board and the second support frame 21, have attraction forces that make these support members not fall off in any direction, and a function of pulling towards an optical axis center when the lens module rotates in a direction perpendicular to the optical axis direction.

As for the lens driving device 100, at least two magnetic yokes 91 are included and are approximately rotationally symmetrical with respect to the optical axis. The magnetic yokes 91 are installed and fixed to the first support frame 20. Like the magnetic yokes 91, at least two magnets 61 are installed and the at least two magnets 61 are approximately rotationally symmetrical with respect to the optical axis. When the at least two magnets 61 and the lens modules 30 rotate, the lens driving device 100 has a function of pulling towards a center of rotation.

The driving coils 70 are provided at the circuit board 80 that is fixed to the base 40 for fixing the circuit board, and are correspondingly arranged at outer sides of the magnets 61.

The driving coil 70 may be a coil winding integrated with the circuit board 80 installed and fixed to the base 40 for fixing the circuit board, or may be a conductive pattern directly formed on the circuit board 80. Through an electromagnetic effect between the driving coils 70 and the magnets 61, the first support frame 20 can rotate and move relative to the base 40 for fixing the circuit board in the direction orthogonal to the optical axis of the lens, thereby achieving a mechanism capable of adjusting rotation of the optical axis of the lens relative to the approximate principal point of the lens.

The lens driving device 100 is further provided with the circuit board 80.

The circuit board 80 is connected to the driving coils 70.

The magnets 61 are opposed to the driving coils 70, with two magnets 61 for each driving coil, and are arranged at positions that are approximately rotationally symmetrical with respect to the optical axis of the lens, that is, at positions that are approximately rotationally symmetrical with respect to a center line.

The driving coil 70 may be connected to a connection terminal 14, which is provided at the base 40 for fixing the circuit board and connected to the outside, or connected to a magnetism detecting element including a driving circuit 81. The magnetism detecting element having a second driving circuit is an example, and it may also be a driver IC with a magnetism detecting function. The magnetism detecting element 81 having the second driving circuit is located at a position opposed to the magnets 61 and can detect positions of the magnets 61 which move together with the lens module 40.

In a case where the optical axis of the lens moves or tends to move due to hand vibration, it can allow a current to flow into the driving coils 70 installed near a level of the center of gravity of the lens module 31, and the driving coils 70 are fixed. Therefore, according to a principle of action force and reaction force, both the lens module 30 and the second support frame 21 can rotate while effectively maintaining a balance relative to the approximate principal point of a moving object, i.e., the lens module 30. In addition, a tendency of movement of the optical axis of the lens can be suppressed. Therefore, movement of the optical axis of the lens can be adjusted.

Figure 8:
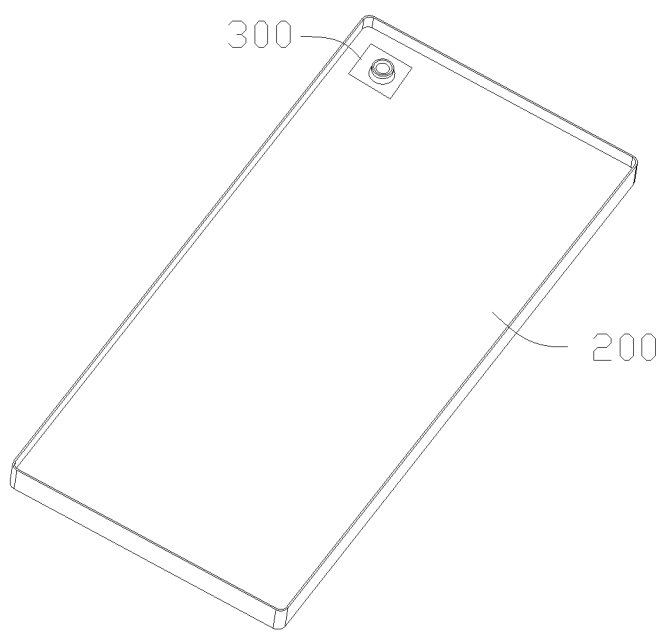
FIG. 8 illustrates a portable electronic apparatus (portable information terminal) including a lens driving device according to an embodiment of the present invention.

The lens driving device 100 described above can be used, for example, as an camera device 300 applied to a portable information apparatus 200 such as a smart phone, a feature phone, or a tablet device, as shown in FIG. 8.

According to the lens driving device 100 of the present invention, movement of the optical axis of the lens can be adjusted, thereby achieving a purpose of preventing vibration, and thus improving the quality of the captured image.

The above description are merely preferred embodiments of the present invention, and a protection scope of the present invention is not limited to the above-described embodiments. Equivalent variations or modifications made by those skilled in the art based on the disclosure of the present invention and they are all included in the scope claimed by the claims of the present application.

What is claimed is:

1. A lens driving device, comprising:
   a case having an accommodation space;
   a lens module;
   support frames, support members, and an electromagnetic driving device, for freely rotating the lens module in a direction orthogonal to an optical axis direction; and
   a base for fixing a circuit board,
   wherein the lens module, the support frames, the support members, the electromagnetic driving device, and the base for fixing the circuit board are accommodated in the accommodation space;
   wherein the electromagnetic driving device is arranged at the support frames and the base for fixing the circuit board, and is arranged adjacent to a level of a center of gravity of the lens module; and
   wherein the support frames comprises a first support frame and a second support frame, each of the first support frame and the second support frame has different movement axes in a plane and is rotatable freely relative to the base for fixing the circuit board;
   wherein further comprising magnetic yokes installed to the first support frame.

2. The lens driving device as described in claim 1, wherein the support members are shaft pins, and at least four shaft pins are provided.

3. The lens driving device as described in claim 1, wherein the second support frame has grooves respectively for rotation in a plane respectively along different movement axes.

4. The lens driving device as described in claim 1, wherein the electromagnetic driving device comprises magnets fixed to the lens module and driving coils fixed to the base for fixing the circuit board.

5. The lens driving device as described in claim 4, wherein each of the driving coils is arranged at an outer side of a respective one of the magnets, and the driving coils are configured to rotate under an electromagnetic interaction generated with the magnets.

6. The lens driving device as described in claim 1, wherein the second support frame has grooves configured to limit directions of the support members.

7. The lens driving device as described in claim 1, further comprising a leaf spring that connects the lens module and the first support frame, wherein the leaf spring has magnetism.

8. A camera, comprising the lens driving device as described in claim 1.

9. A portable electronic apparatus, comprising the camera as described in claim 8.

* * * * *